(12) United States Patent
Husney (10) Patent No.: US 8,036,138 B2
(45) Date of Patent: Oct. 11, 2011

(54) SYSTEM AND METHOD FOR OPTIMIZED INITIAL CONFIGURATION DISTRIBUTION FOR CYCLIC SLEEPING DEVICES

(75) Inventor: Jordan Husney, Minneapolis, MN (US)

(73) Assignee: Digi International Inc., Minnetonka, MN (US)

( * ) Notice: Subject to any disclaimer, the term of this patent is extended or adjusted under 35 U.S.C. 154(b) by 125 days.

(21) Appl. No.: 12/629,293

(22) Filed: Dec. 2, 2009

(65) Prior Publication Data

US 2011/0128886 A1    Jun. 2, 2011

(51) Int. Cl.
*H04J 1/16* (2006.01)
*H04B 7/216* (2006.01)

(52) U.S. Cl. ......... 370/252; 370/254; 370/329; 370/412

(58) Field of Classification Search ................... 370/252, 370/329, 412, 254
See application file for complete search history.

(56) References Cited

U.S. PATENT DOCUMENTS
2002/0012320 A1 * 1/2002 Ogier et al. ................... 370/252

FOREIGN PATENT DOCUMENTS
EP          2056529 A1    5/2009
WO     WO-02/19745 A1    3/2002

OTHER PUBLICATIONS

"International Application Serial No. PCT/US2010/058702, Search Report mailed Feb. 8, 2011", 4 pgs.
"International Application Serial No. PCT/US2010/058702, Written Opinion mailed Feb. 8, 2011", 7 pgs.

* cited by examiner

*Primary Examiner* — John Pezzlo
(74) *Attorney, Agent, or Firm* — Schwegman, Lundberg & Woessner, P.A.

(57) ABSTRACT

Various embodiments include a method and system for optimizing the initial configuration of cyclic sleeping devices on a wireless network. The devices, or nodes, may need additional configuration by a configuration device after being placed on the network. Some nodes may sleep and not report in to the configuration device causing the configuration device to reach out to these non-reporting nodes. The configuration device may have limited resources with which to transmit the configuration to the nodes, and so the network can be efficiently configured if the configuration device reaches out to non-reporting nodes when it does not expect to use its transmission resources to configure a reporting node. This can be accomplished by maintaining a list of nodes yet to be configured, using the node configuration and reporting times to determine periods in which the configuration device's transmission resources will be idle, contacting non-reporting nodes during those periods.

15 Claims, 5 Drawing Sheets

SYSTEM AND METHOD FOR OPTIMIZED INITIAL CONFIGURATION DISTRIBUTION FOR CYCLIC SLEEPING DEVICES

TECHNICAL FIELD

This document pertains generally to networked devices, and more particularly, but not by way of limitation, to a system and method for optimized initial configuration distribution for cyclic sleeping devices.

BACKGROUND

Nodes, also known as devices, attached to a network may need initial configuration parameters distributed to them in order to fully function on the network. Typically, some configuration parameters are supplied with the nodes themselves and other parameters are distributed by a configuration device. Some networks may be composed of nodes with a limited capability to transmit to other nodes in the network. This limited capability can sometimes extend to limits on a node's ability to simultaneously transmit to more than a limited number of other nodes. Wireless nodes power down, or sleep, to reduce power consumption. Typically, the nodes can be contacted only when they are awake; wireless nodes can have differing sleep characteristics. These differing sleep characteristics can make it difficult to configure nodes in the network.

OVERVIEW

In systems that include configuration devices with limited communication bandwidth, it can be advantageous to efficiently manage communication with nodes to be configured. Attempting to contact non-reporting nodes when the configuration device's limited transmit resource is not expected to be in use increases the efficiency of the configuration procedure. Utilizing known reporting times and sleep periods of the reporting nodes allows the configuration device to predict when its transmission resources will be free to attempt to contact and configure non-reporting nodes. This document provides numerous examples in the detailed description, an overview of which is included below.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Nodes in wireless networks may require further configuration once they are connected to the network. The configuration parameters distributed to these nodes will typically be supplied by a configuration device. It can be advantageous for the configuration device to monitor, for each node, the node configuration and behavior to more efficiently use the configuration device's resources in configuring the nodes.

Figure 1:
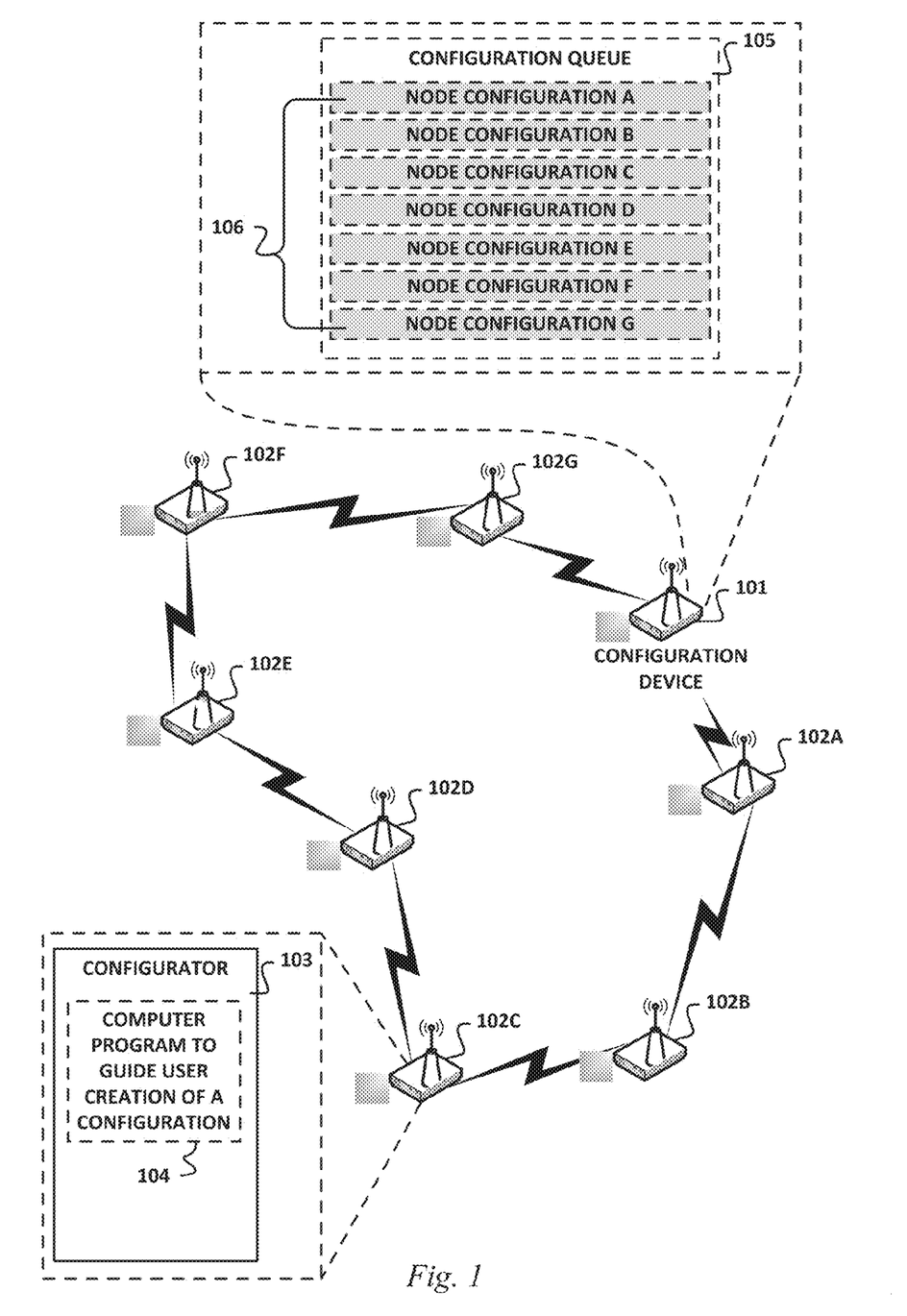
FIG. 1 illustrates an example system to configure nodes in a wireless network.

FIG. 1 illustrates an example system to configure the nodes connected to a wireless network. The configuration device 101 is connected to the network nodes 102A-G.

In various examples the nodes 102A-G may be many different types of devices that are able to communicate on the wireless network, including, but not limited to: a personal computer, a thermostat, a laptop computer, a television, a refrigerator, and a phone. In various examples the nodes 102A-G can sleep for a period of time to, among other things, conserve power. In various examples non-sleeping nodes are nodes that do not sleep. In various examples reporting nodes are nodes that contact the configuration device 101 to be configured, while non-reporting nodes do not contact the configuration device 101. In various examples the nodes 102A-G can not be contacted unless they are awake. Thus, attempts by the configuration device 101 to contact a node can fail if the node is sleeping.

In various examples the wireless network may be a peer-to-peer mesh network, as illustrated in FIG. 1, or, in other examples, it may be a hub-and-spoke network, such as a WI-FI™ network, or any other wireless network where the nodes 102A-G and the configuration device 101 can communicate with each other. In various examples the wireless network is a limited resource network in which the nodes 102A-G and the configuration device 101 can simultaneously transmit to a limited number of other nodes, a transmission resource being used for each transmission. In various examples the configuration device 101 includes as many transmission resources as nodes it can configure in parallel and the underlying wireless network supports. Accordingly, transmission resources represent the outbound, or transmission, bandwidth of a node.

In various examples the configuration device 101 uses a transmission resource to transmit a node configuration to a node, i.e. to configure the node a transmission resource is used by the configuration device 101. The configuration device 101 also uses a transmission resource to contact a node in an attempt to configure it. The transmission resource will be wasted if the node is sleeping, preventing it from being configured, while another node is awake and ready to be configured. Accordingly, the configuration procedure is retarded because of the lost configuration opportunity. Using reporting node data, the configuration device 101 can determine time windows in which attempting to contact non-reporting nodes will not interfere with the configuration of nodes ready to be configured, thus increasing the efficiency of the node configuration procedure. In various examples the configuration device calculates the time remaining in the sleep cycles for the reporting nodes yet to be configured to determine if one is expected to report in within a period of time from the current time. If no reporting node is expected within the period of time, i.e. the transmission resources will be idle within that period, then the configuration device can attempt to contact non-reporting nodes without decreasing the efficiency of the configuration procedure.

In various examples there is a configurator 103 that can create a configuration to be used by the configuration device 101. The configuration can be composed of a node configuration 106 for each node to be configured. In various examples the configuration can be created by a user, for example, by creating a text file with a node configuration 106 on each line, or other file formats parsable by the configuration device 101. In various examples the configuration could also be created by a user entering node configurations 106 via a terminal into the configuration device 101. In various examples a user can use a configuration assistant computer program 104 to assist in creating the node configurations 106. The computer program 104 having a user interface and knowledge of the configuration format to prompt a user for the configuration parameters for the nodes 102A-G. In various examples the computer program 104 can gather a list of nodes to be configured. In various examples the configuration assistant program 104 can reside on a node 102C in the network if the node is a computer of sufficient resource to run the program. In various examples the computer program 104 may not reside on the wireless network if there is some mechanism to transfer the configuration to the configuration device 101, such as by, for example, using a solid state memory card.

In various examples the configuration device 101 can include a configuration queue 105. In various examples the configuration device 101 is configured to populate the configuration queue 105 with the node configurations 106 from the configuration. In various examples the configuration device 101 is configured to create the configuration queue 105 with an entry for each node configuration 106 in the configuration and to create additional fields for each node to be configured 102A-G, such as, for example, a sleep-time and a last heard from time.

In various examples the configuration device 101 can be a personal computer, an appliance, or any other device capable of receiving the configuration, managing the configuration queue 105, and configuring devices.

Figure 2:
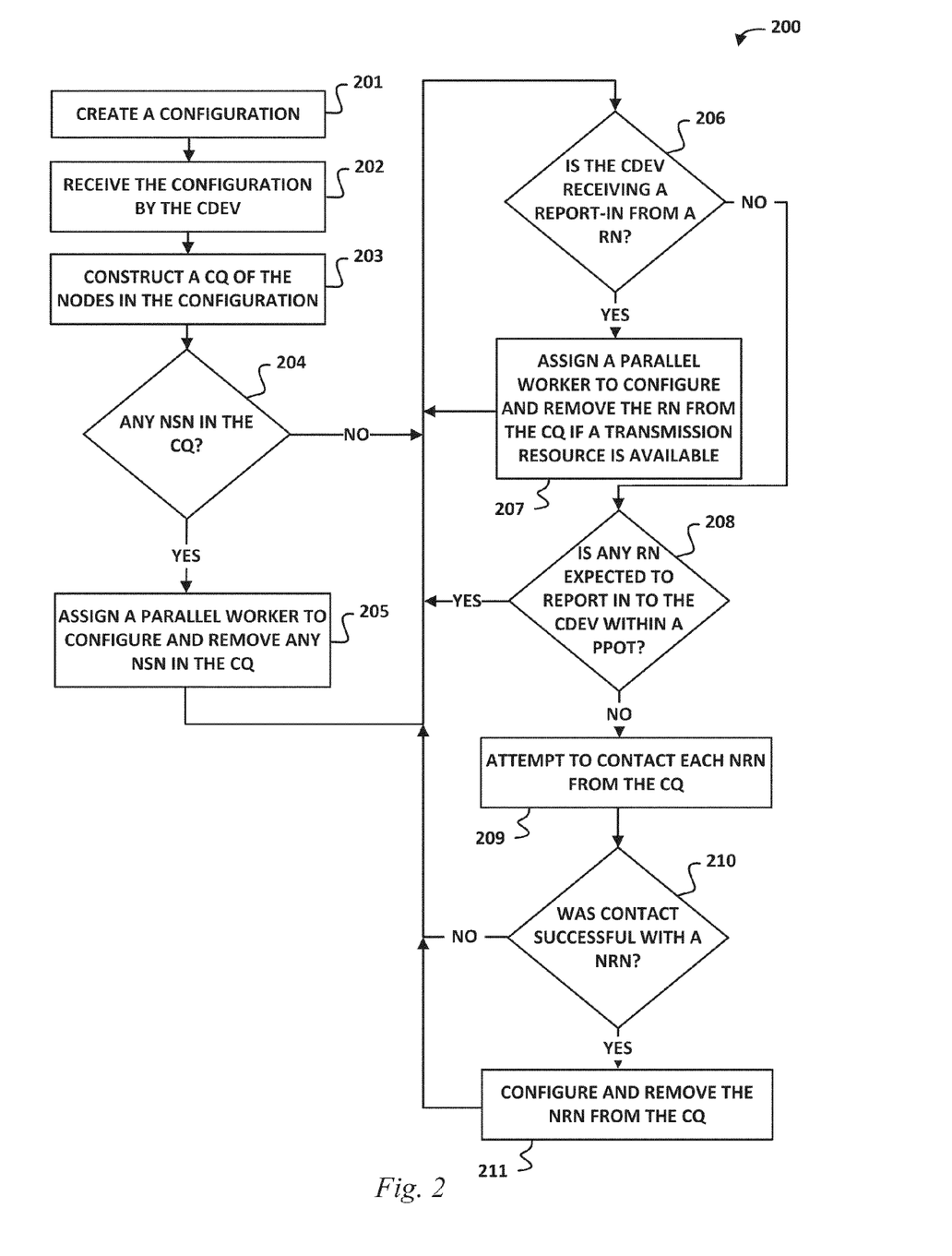
FIG. 2 illustrates a flowchart for an example method to configure nodes in a wireless network.

FIG. 2 illustrates an example flowchart for a method 200 to configure the nodes 102A-G connected to a wireless network. Various components from the system shown in FIG. 1 can be used to implement the method 200 and components from that system are used here for illustrative purposes.

At 201 a configuration is created. In various examples the configuration can include a node configuration 106 for each node to be configured 102A-G.

At 202, the configuration device 101, labeled in FIG. 2 as "CDEV," receives the configuration. As noted above, in various examples, the configuration device 101 can receive the configuration via the wireless network, or by other means including, through a solid state storage device, or an additional interface such as, for example, a serial data connection.

At 203, the configuration device 101 constructs a configuration queue 105, labeled in FIG. 2 as "CQ." In various examples the configuration queue 105 includes each of the nodes to be configured 102A-G in the configuration. In various examples the configuration queue 105 can be populated with the node configurations 106 in the configuration. In various examples the configuration queue 105 can include more or fewer data fields than the node configuration 106, additional fields being, for example, sleep-time or last heard from time.

At 204, the configuration device 101 determines if there are any non-sleeping nodes, labeled in FIG. 2 as "NSN," in the configuration queue 105. In various examples a non-sleeping node can be identified by the omission of a sleep-time in its corresponding node configuration 106.

At 205, if at 204 it is determined that non-sleeping nodes exist in the configuration queue 105, in various examples the configuration device 101 will configure the non-sleeping nodes. In various examples the configuration device 101 can simultaneously configure the same number of non-sleeping nodes as it has available transmission resources, i.e. a number of non-sleeping nodes equal to the configuration device's 101 available transmission resources can be configured in parallel. In various examples the configuration device 101 will use a parallel worker to configure each non-sleeping node. In various examples the configuration device 101 will prioritize the configuration of the non-sleeping nodes.

At 206, if at 204 it is determined that there are no non-sleeping nodes in the configuration queue 105, or, at 205, the non-sleeping nodes have been configured, the configuration device 101 determines whether it is receiving a report-in from a reporting node, labeled in FIG. 2 as "RN." In various examples nodes 102A-G are considered reporting nodes until a sleep cycle has elapsed without receiving a report-in.

Figure 3A:
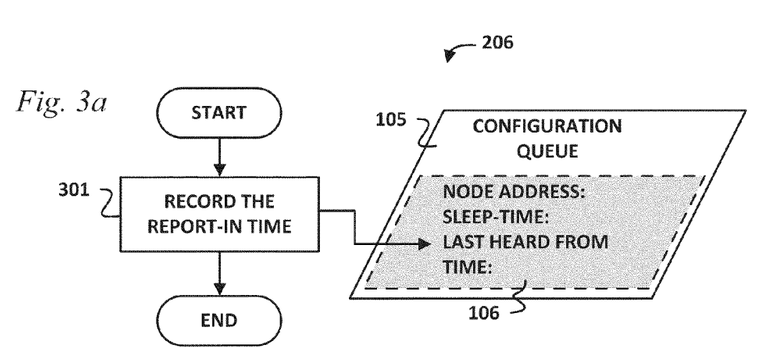
FIG. 3*a* illustrates a flowchart for an example method to record the last heard from time for a reporting node.

Referring to FIG. 3a, at 301, in various examples the configuration device 101 can record a last heard from time for the reporting node in, for example, the node configuration 106 in the configuration queue 105. It will be understood to one skilled in the art that the last heard from time can be stored in other locations as long as the configuration device 101 can correlate the last heard for a given reporting node to the reporting node.

Referring back to FIG. 2, at 207, if at 206 it is determined that a reporting node is reporting in and a transmission resource is available, the configuration device 101 configures the reporting device and removes it from the configuration queue 105. In various examples the configuration device 101 can simultaneously configure the same number of reporting nodes as it has available transmission resources, i.e. a number of reporting nodes equal to the configuration device's 101 available transmission resources can be configured in parallel. In various examples the configuration device 101 will use a parallel worker to configure each reporting node. In various examples the recording of the last heard from time illustrated in FIG. 3a may be delayed to determine if a transmission resource is available, thus removing the need to record the last heard from time if the reporting node can be immediately configured.

At 208, if at 206 it is determined that a reporting node is not reporting in, the configuration device 101 determines whether any reporting node is expected to report in within a predetermined period of time, labeled in FIG. 2 as "PPOT." In various examples the predetermined period of time is a time sufficient to attempt a transmission to a node. In various examples the predetermined period of time is equal to the transmission timeout period for the wireless network.

Figure 3B:
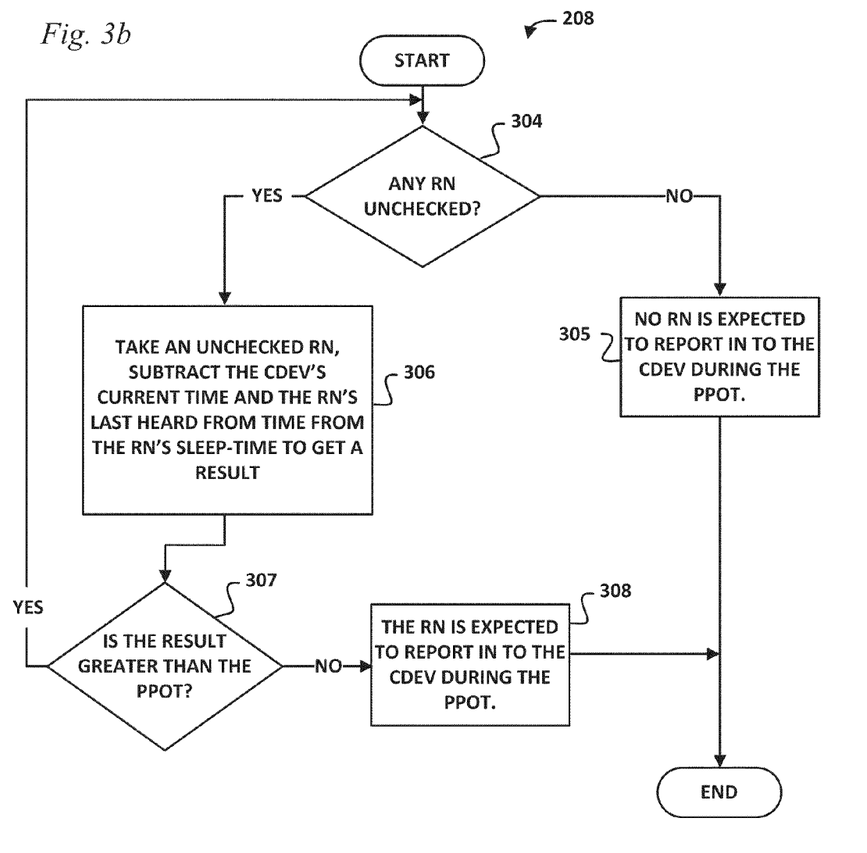
FIG. 3*b* illustrates a flowchart for an example method to determine whether a reporting node will report in within a predetermined period of time.

Referring to FIG. 3b, a flowchart illustrates an example method 208 for determining whether a reporting node is expected to report in to the configuration device 101 within a predetermined period of time.

At 304, it is determined whether any reporting node in the configuration queue 105 is unchecked, i.e. is the reporting node is expected to report-in within the predetermined period.

At 305, if at 304 it is determined that no reporting node in the configuration queue 105 remains unchecked, then no reporting node is expected to report in within the predetermined period of time and the method 208 ends.

At 306, if at 304 it is determined that a reporting node in the configuration queue 105 remains unchecked, the configuration device 101 determines the amount of time remaining in the reporting node's sleep cycle. In various examples the following calculation determines the time remaining in the reporting node's sleep cycle:

$$ST_{RN} - CT_{CDEV} - LHFT_{RN} = TR_{SC} \qquad \text{Eq. 1:}$$

Where $ST_{RN}$ is the sleep-time for the reporting node, $CT_{CDEV}$ is the current time on the configuration device 101, $LHFT_{RN}$ is the last heard from time corresponding to the reporting node, and $TR_{SC}$ is the time remaining in the sleep cycle.

At 307, $TR_{SC}$ from 306 is compared with the predetermined period of time and it is determined whether $TR_{SC}$ is greater than, equal to, or less than the predetermined period of time.

At 308, if at 307 it is determined that $TR_{SC}$ is less than or equal to the predetermined period of time, then the reporting node is expected to report in to the configuration device 101 within the predetermined period of time and the method 208 ends. In various examples this inequality can be expressed with the following equation:

$$ST_{RN} - CT_{CDEV} - LHFT_{RN} \leq PPoT \qquad \text{Eq. 2:}$$

Where PPoT is the predetermined period of time and all other terms are as they were in Eq. 1.

If, at 307 it is determined that $TR_{SC}$ is greater than the predetermined period of time, then the method 208 continues at 304 until there are no unchecked reporting nodes remaining in the configuration queue 105 or a reporting node is found that will report in to the configuration device 101 within the predetermined period of time. In various examples this inequality can be expressed with the following equation:

$$ST_{RN} - CT_{CDEV} - LHFT_{RN} > PPoT \qquad \text{Eq. 3:}$$

Where the terms are as they were in Eq. 1 and Eq. 2.

Referring back to FIG. 2, again at 208, if it is determined that a reporting node is expected to report in to the configuration device 101 within the predetermined period of time, the method 200 proceeds to 206 to await the report-in of a reporting node.

At 209, if at 208, it is determined that a reporting node is not expected to report in to the configuration device 101 within the predetermined period of time, the configuration device 101 proceeds to attempt to contact a non-reporting node. In various examples the configuration device 101 will attempt to simultaneously contact as many non-reporting nodes as it has available transmission resources, i.e. an attempt to contact a number of non-reporting nodes equal to the configuration device's 101 available transmission resources will be carried out in parallel. In various examples the configuration device 101 will assign a parallel worker to attempt to configure each non-reporting node. In various examples a non-reporting node is identified as a node in the configuration queue 105 that does not have a last heard from time recorded. In various examples nodes without a last heard from time recorded are considered non-reporting nodes only after a period of time equal to the node's sleep-time.

At 210, the configuration device 101 determines whether contact with the non-reporting node was successful. In various examples a contact is unsuccessful if contact is not established, under the conventions of the underlying network layer, within the transmission timeout period for the underlying network layer. It will be understood by one skilled in the art that the underlying network layer can include multiple protocol layers, including, but not limited to, TCP/IP, WI-FI™, and ZigBee™. In various examples a successful contact occurs when the non-reporting node is awake.

If, at 210, it is determined that contacting a non-reporting node was unsuccessful, the method 200 proceeds to 206.

At 211, if, at 210, it is determined that contacting a non-reporting node was successful, the configuration device 101 configures the non-reporting node and removes the non-reporting node from the configuration queue 105. In various examples the configuration device 101 can simultaneously configure all successfully contacted non-reporting nodes from 209. The method 200 then proceeds to 206.

In various examples initial configuration distribution to the nodes concludes when the configuration queue 105 is empty, i.e. initial configuration is done when all of the nodes have been configured.

It will be understood that the initial configuration distribution is performed more efficiently than, for example, naively and contacting nodes, randomly or otherwise, by expending the configuration device's 101 limited transmission resources to configure awake nodes rather than attempting to configure node that may not be awake. In other words, resources are budgeted for expenditures associated with expected outcomes (awake, configurable nodes) and resources are applied to expenditures with unexpected outcomes (attempting to configure non-reporting nodes) when there is a surplus (the excess of transmission resources over the number of expected reporting nodes within a given time). Using the method 200 produces predictable results for configuring reporting nodes because the configuration attempts to the non-reporting nodes do not impact the configuration of the reporting nodes. If it is assumed that all reporting nodes have the same sleep-time, the time to configure a given node is negligible, the following equations can predict the worst-case scenario to configure the reporting nodes:

$$\text{Config}_{WCT}(CQ) = ST\left(\frac{RN_{CQ} - (RN_{CQ}(\text{mod}N))}{N} + 1\right) \qquad \text{Eq. 4}$$

Where $\text{Config}_{WCT}$ is the worst case scenario, $RN_{CQ}$ is the number of reporting nodes in the configuration queue 105, N is the number of nodes the configuration device 101 can simultaneously configure, CQ is the configuration queue 105, and ST is the sleep-time. The worst case occurs when the reporting nodes are in sync, or not out of phase, with each other, the reporting nodes just began a sleep cycle as the configuration procedure started, and the number of reporting nodes in the configuration queue 105 is not a multiple of the number of nodes the configuration device 101 can simultaneously configure. Thus, a number of sleep-time periods must elapse equal to the quotient of integer division of the reporting nodes in the configuration queue 105 and the number of simultaneous configurations the configuration device 101 can perform plus one more sleep-time period for the remaining reporting nodes. It will be understood that this result is superior over naively attempting to contact the reporting nodes because all available transmission resources can be utilized to configure reporting nodes when they are configurable and not wasted by contacting a sleeping node which can not be configured.

Figure 4:
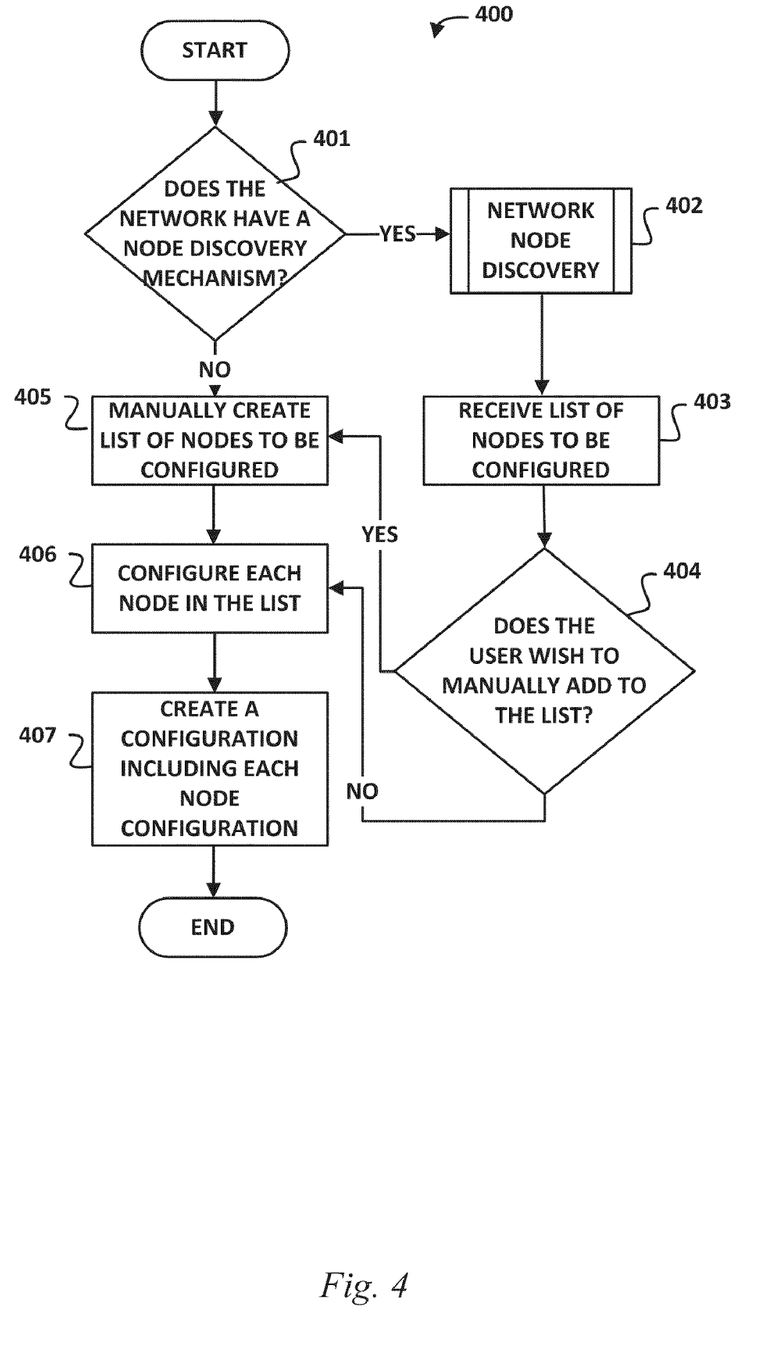
FIG. 4 illustrates a flowchart for an example method to identify nodes that need to be configured.

FIG. 4 illustrates an example method 400 for identifying nodes to be configured 102A-G. In various examples the identification process uses the node address to represent the node. In various examples the node address can be intrinsic to the node like, for example, a serial number or address assigned at the point of manufacture. In various examples the address can be assigned by the underlying network layer.

At 401 a determination is made as to whether the underlying network layer has a node discovery mechanism.

At 402, if at 401 the underlying network layer does have a node discovery mechanism, that discovery mechanism is invoked. In various examples the user can make a choice as to whether or not to use the discovery mechanism.

At 403, the resulting list of network nodes generated at 402 is received. In various examples the user will be presented with the list via a user interface.

At 404, a determination is made as to whether the user wishes to modify the list received at 403.

At 405, if at 401 it is determined that the underlying network layer does not have a node discovery mechanism, or at 404, it is determined that the user does not wish to manually modify the list received from 403, the user can manually modify, or create, the list of nodes to be configured.

At 406, each node in the list of nodes to be configured from 405, is configured, i.e. a node configuration 106 is created for each node in the list of nodes to be configured. In various examples the node configuration 106 can include, but is not limited to, a sleep-time. In various examples the sleep-time can be zero or undefined. In various examples a zero or undefined sleep-time indicates that the node is a non-sleeping node.

At 407, a configuration is created and populated by the node configurations 106 from 406. In various examples the configuration only includes the node configurations 106. In various examples the configuration can contain other data, such as meta data including, but not limited to, a name for the configuration and a creation date.

Figure 5:
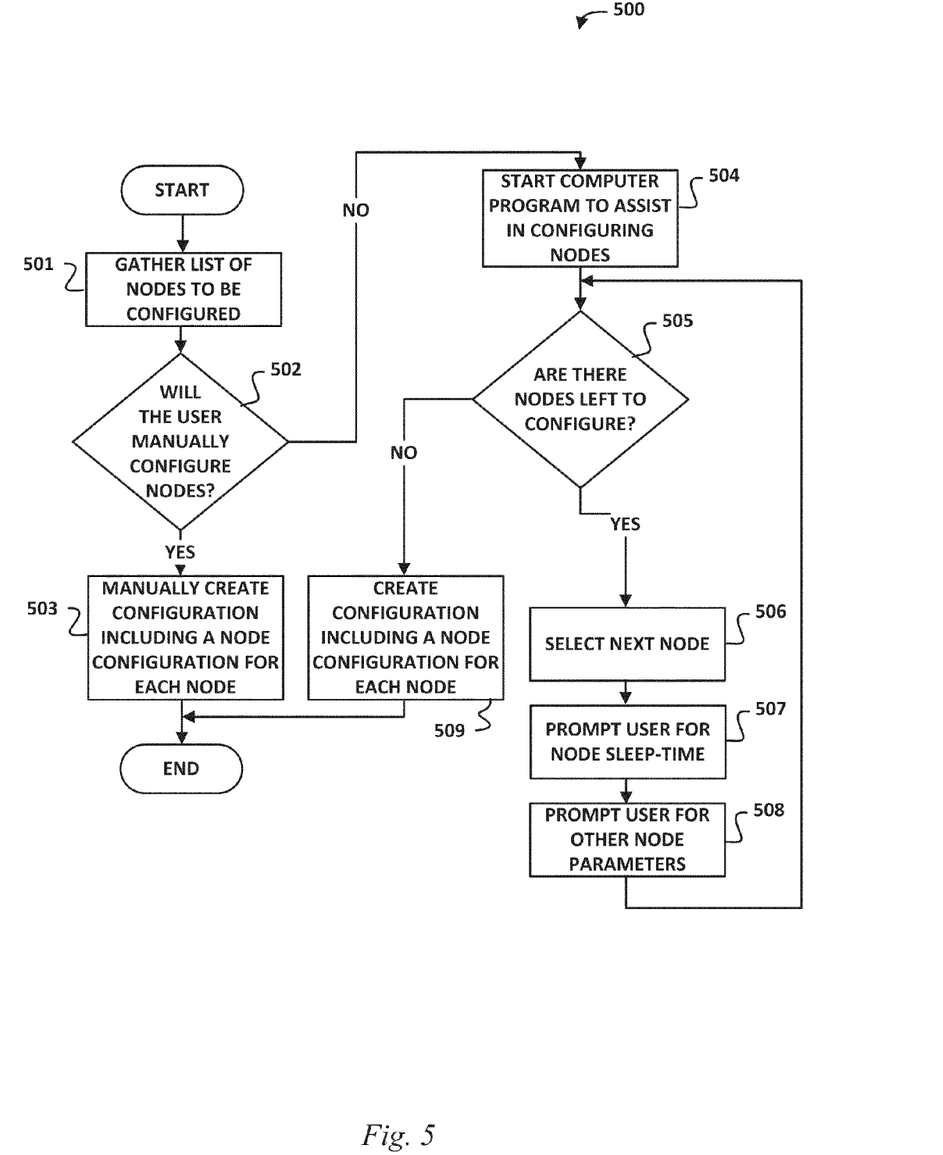
FIG. 5 illustrates a flowchart for an example method of creating the configuration.

FIG. 5 illustrates a flowchart of an example method 500 for configuring nodes.

At 501 the list of nodes to be configured is gathered. In various examples an underlying network layer discovery mechanism, as previously discussed, and illustrated at FIG. 4, at 402, can be used. In various examples the user can generate the list of nodes to be configured manually. In various examples the user can use a hybrid approach of utilizing the underlying network layer discovery mechanism and manually generating the list of nodes to be configured.

At 502 a determination is made as to whether the user will manually configure the nodes in the list from 501.

At 503, if at 502 it is determined that the user will manually configure the nodes, the user proceeds to manually configure the nodes, i.e. to create a configuration containing a node configuration 106 for each node in the nodes to be configured list. In various examples this can be accomplished by user creation of a text file containing machine parsable entries. In various examples the text file can be formatted with a node configuration 106 on each line and a delimiter between configuration parameter fields, such as the node address and sleep-time. In various examples the user can create a database table with a row representing a node configuration 106 and columns for each configuration parameter. It will be understood that different database organizations can be utilized to the same effect. It will be understood that different configuration formats can be utilized that can store the node configurations 106 and are readable by the configuration device 101.

At 504, if at 502 it is determined that the user will not manually configure the nodes, a computer program 104 is invoked to assist the user in configuring the nodes. In various examples the computer program 104 will have a user interface. In various examples the user interface can be, for example, a terminal based user interface, a graphical based user interface, or a web based user interface. In various examples the computer program 104 can be given the list of nodes to be configured. In various examples the computer program 104 can retrieve the list of nodes to be configured. In various examples the computer program 104 can perform 501.

At 505 a determination is made as to whether there are nodes in the nodes to be configured list for which a node configuration 106 has not been created.

At 506, if at 505 it is determined that there are nodes in the nodes to be configured list for which a node configuration 106 has not been created, a next node is selected from the nodes to be configured list for which a node configuration 106 has not been created. In various examples the computer program 104 displays the selected node to the user. In various examples more than one node can be selected and displayed to the user.

At 507, the computer program 104 prompts the user to enter the sleep-time for the selected node. In various examples the sleep-time can be manually entered. In various examples the sleep-time can be selected from a list. In various examples the computer program 104 can verify the propriety of a sleep-time entry based on engineering parameters made available to the computer program 104.

At 508, 507 is repeated for each node configuration 106 parameter other than the sleep-time parameter. In various examples the computer program 104 can present all parameters to the user at the same time. In various examples the computer program 104 can present one parameter to the user at a time and permit the user to "step" through each parameter. In various examples the computer program 104 can include text or other information to assist the user in populating the parameter field. The method 500 then proceeds to 505.

At 509, if at 505 it is determined that there are no nodes in the nodes to be configured list for which a node configuration 106 has not been created, a configuration is created containing each node configuration 106 generated by the computer program 104. In various examples the configuration format can vary as previously discussed with respect to 503.

Initial node configuration 106 distribution can be more efficiently performed when node characteristics and behaviors are accounted for. By determining which nodes are configurable at a given time, limited configuration resources can be allocated to available nodes, ensuring prompt configuration, and excess resources can be determined and employed in riskier attempts to contact possibly sleeping nodes. Thus, the limited resources are used to their fullest extent at any given time in the configuration procedure.

In one example a system is described. In this example the system comprises: a plurality of nodes, the plurality of nodes connected to a wireless network; a configurator, the configurator configured to create a configuration containing a node configuration for each node in the plurality of nodes; and a configuration device connected to the wireless network and able to communicate with the plurality of nodes. In this example the configuration device is configured to: receive the configuration; construct a configuration queue including each node in the configuration; determine if any nodes in the configuration queue are non-sleeping nodes; configure and remove each non-sleeping node from the configuration queue; receive a report-in from a reporting node from the configuration queue; configure and remove the reporting node from the configuration queue when the report-in is received and a transmission resource is available; determine if any reporting nodes in the configuration queue are expected to report in to the configuration device within a predetermined period of time; if a reporting node is expected to report in during the predetermined period of time, wait for the report-in; if a reporting node is not expected to report in during the predetermined period of time, attempt to contact one or more non-reporting nodes in the configuration queue; and if the configuration device successfully contacts a non-reporting node, configuring and removing that non-reporting node from the configuration queue.

In a second example, in a system having a plurality of nodes connected across a wireless network to a configuration device, a method of configuring the plurality of nodes is described. In this example, the method comprises: creating a configuration, the configuration including a node configuration for each node in the plurality of nodes; receiving the configuration by the configuration device; constructing a configuration queue including each node from the configuration; determining if any nodes in the configuration queue are non-sleeping nodes; configuring and removing from the configuration queue each non-sleeping node; receiving a repot-in by the configuration device from a reporting node in the configuration queue; configuring and removing the reporting node from the configuration queue when the report-in is received and a transmission resource is available; determining if any reporting node is expected to repot in to the configuration device within a predetermined period of time; if a reporting node is expected to report in during the predetermined period of time, waiting for the report-in; if a reporting node is not expected to report in during the predetermined period of time, attempting to contact one or more non-reporting nodes in the configuration queue; and if the configuration device successfully contacts a non-reporting node, configuring and removing that non-reporting node from the configuration queue.

In a third example, in a system having a plurality of nodes connected across a wireless network to a configuration device, a tangible computer readable medium having computer executable instructions stored thereon for causing a computer to perform a method of configuring the plurality of nodes is described. In this example, the method comprises: creating a configuration, the configuration including a node configuration for each node in the plurality of nodes; receiving the configuration by the configuration device; constructing a configuration queue including each node from the configuration; determining if any nodes in the configuration queue are non-sleeping nodes; configuring and removing from the configuration queue each non-sleeping node; receiving a repot-in by the configuration device from a reporting node in the configuration queue; configuring and removing the reporting node from the configuration queue when the report-in is received and a transmission resource is available; determining if any reporting node is expected to repot in to the configuration device within a predetermined period of time; if a reporting node is expected to report in during the predetermined period of time, waiting for the report-in; if a reporting node is not expected to report in during the predetermined period of time, attempting to contact one or more non-reporting nodes in the configuration queue; and if the configuration device successfully contacts a non-reporting node, configuring and removing that non-reporting node from the configuration queue.

Additional Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a tangible computer-readable medium or tangible machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A system comprising:
   a plurality of nodes, the plurality of nodes connected to a wireless network;
   a configurator, the configurator configured to create a configuration including a node configuration for each node in the plurality of nodes; and
   a configuration device, connected to the wireless network and able to communicate with the plurality of nodes, the configuration device configured to:
   receive the configuration;
   construct a configuration queue including each node in the configuration;
   determine if any nodes in the configuration queue are non-sleeping nodes;
   configure and remove each non-sleeping node from the configuration queue;
   receive a message from a reporting node from the configuration queue, wherein reporting nodes are nodes that contact the configuration device in order to be configured;
   configure and remove the reporting node from the configuration queue when the message is received and a transmission resource is available;
   determine if any reporting nodes in the configuration queue are expected to report in to the configuration device within a predetermined period of time;
   if a reporting node is expected to report in during the predetermined period of time, wait for the message;
   if a reporting node is not expected to report in during the predetermined period of time, attempt to contact one or more non-reporting nodes in the configuration queue; and
   if the configuration device successfully contacts a non-reporting node, configure and remove that non-reporting node from the configuration queue.

2. The system of claim 1, wherein the configuration device includes a limited number of transmission resources.

3. The system of claim 2, wherein the transmission resource is outbound bandwidth.

4. The system of claim 2, wherein the limited number of transmission resources is equal to the number of transmissions in parallel supported by the configuration device and the wireless network.

5. The system of claim 1, wherein receiving the message from the reporting node includes recording a first current time, wherein the first current time is stored as a last heard from time for the reporting node; and
   wherein the node configuration for each of the plurality of nodes includes a sleep-time.

6. The system of claim 5, wherein determining if any reporting nodes in the configuration queue are expected to report in to the configuration device within a predetermined period of time includes, for each reporting node in the configuration queue:
   calculating an elapsed time as a difference between a second current time from the configuration device and the last heard from time corresponding to a reporting node;
   calculating an amount of time remaining in a sleep cycle for the reporting node as a difference between a sleep-time corresponding to the reporting node and the elapsed time;
   comparing the amount of time remaining with the predetermined period of time; and
   recognizing that the reporting node is expected to report in to the configuration device within the predetermined period of time if the predetermined period of time is less than the amount of time remaining.

7. The system of claim 1, wherein the plurality of nodes includes a plurality of device types.

8. A computer-implemented method of configuring a plurality of nodes, the method comprising:
   creating a configuration representing the plurality of nodes connected across a wireless network to a configuration device, the configuration including a node configuration for each node in the plurality of nodes;
   receiving the configuration by the configuration device;
   constructing a configuration queue including each node from the configuration;
   determining if any nodes in the configuration queue are non-sleeping nodes;
   configuring and removing from the configuration queue each non-sleeping node;
   receiving a message in by the configuration device from a reporting node in the configuration queue, wherein reporting nodes are nodes that contact the configuration device in order to be configured;
   configuring and removing the reporting node from the configuration queue when the message is received and a transmission resource is available;
   determining if any reporting node is expected to report in to the configuration device within a predetermined period of time;
   if a reporting node is expected to report in during the predetermined period of time, waiting for the message;
   if a reporting node is not expected to report in during the predetermined period of time, attempting to contact one or more non-reporting nodes in the configuration queue; and
   if the configuration device successfully contacts a non-reporting node, configuring and removing that non-reporting node from the configuration queue.

9. The method of claim 8, where the configuration device includes a limited number of transmission resources.

10. The method of claim 9, wherein the transmission resource is outbound bandwidth.

11. The method of claim 9, wherein the limited number of transmission resources is equal to the number of transmissions in parallel supported by the configuration device and the wireless network.

12. The method of claim 8, wherein receiving the message includes recording a first current time, wherein the first current time is stored as a last heard from time for the reporting node; and
   wherein the node configuration for each of the plurality of nodes includes a sleep-time.

13. The method of claim 12, wherein determining if any reporting node is expected to report in to the configuration device within a predetermined period of time includes, for each reporting node in the configuration queue:
   calculating an elapsed time as a difference between a second current time from the configuration device and the last heard from time corresponding to a reporting node;
   calculating an amount of time remaining in a sleep cycle for the reporting node as a difference between a sleep-time corresponding to the reporting node and the elapsed time;
   comparing the amount of time remaining with the predetermined period of time; and
   recognizing that the reporting node is expected to report in to the configuration device within the predetermined period of time if the predetermined period of time is less than the amount of time remaining.

14. The method of claim 8, wherein the plurality of nodes includes a plurality of device types.

15. A tangible computer readable medium having computer executable instructions stored thereon for causing a computer to perform a method of configuring a plurality of nodes, the method comprising:
- creating a configuration representing the plurality of nodes connected across a wireless network to a configuration device, the configuration including a node configuration for each node in the plurality of nodes;
- receiving the configuration by the configuration device;
- constructing a configuration queue including each node from the configuration;
- determining if any nodes in the configuration queue are non-sleeping nodes;
- configuring and removing from the configuration queue each non-sleeping node;
- receiving a message by the configuration device from a reporting node in the configuration queue, wherein reporting nodes are nodes that contact the configuration device in order to be configured;
- configuring and removing the reporting node from the configuration queue when the message is received and a transmission resource is available;
- determining if any reporting node is expected to report in to the configuration device within a predetermined period of time;
- if a reporting node is expected to report in during the predetermined period of time, waiting for the message;
- if a reporting node is not expected to report in during the predetermined period of time, attempting to contact one or more non-reporting nodes in the configuration queue; and
- if the configuration device successfully contacts a non-reporting node, configuring and removing that non-reporting node from the configuration queue.

* * * * *

UNITED STATES PATENT AND TRADEMARK OFFICE
CERTIFICATE OF CORRECTION

| | |
|---|---|
| PATENT NO. | : 8,036,138 B2 |
| APPLICATION NO. | : 12/629293 |
| DATED | : October 11, 2011 |
| INVENTOR(S) | : Jordan Husney |

It is certified that error appears in the above-identified patent and that said Letters Patent is hereby corrected as shown below:

In column 9, line 14, delete "repot-in" and insert -- report-in --, therefor.

In column 9, line 19, delete "repot in" and insert -- report in --, therefor.

In column 9, line 41, delete "repot-in" and insert -- report-in --, therefor.

In column 9, line 45, delete "repot in" and insert -- report in --, therefor.

Signed and Sealed this
Sixth Day of March, 2012

David J. Kappos
*Director of the United States Patent and Trademark Office*